United States Patent [19]

Manson

[11] 4,355,248
[45] Oct. 19, 1982

[54] STEPPER MOTOR

[75] Inventor: Harry G. Manson, Princeton, Ind.

[73] Assignee: IMC Magnetics Corp., Jericho, N.Y.

[21] Appl. No.: 285,657

[22] Filed: Jul. 21, 1981

[51] Int. Cl.³ ............................................. H02K 37/00
[52] U.S. Cl. .................................... 310/42; 310/49 R; 310/257
[58] Field of Search ...................... 310/42, 49 R, 49 A, 310/162–164, 156, 257; 29/596

[56] References Cited

U.S. PATENT DOCUMENTS

| Re. 28,075 | 7/1974 | Kavanaugh | 310/156 X |
| 3,633,055 | 1/1972 | Maier | 310/162 X |
| 4,107,559 | 8/1978 | Patel | 310/49 R |
| 4,174,485 | 11/1979 | Soden et al. | 310/49 R X |

FOREIGN PATENT DOCUMENTS

| 737990 | 7/1943 | Fed. Rep. of Germany | 310/42 |
| 2613038 | 10/1976 | Fed. Rep. of Germany | 310/156 |

Primary Examiner—John Gonzales
Attorney, Agent, or Firm—Alan H. Levine

[57] ABSTRACT

A stepper motor including a pair of annular stator plates each having a plurality of poles surrounding a central opening, the plates being fixed to each other in back-to-back relation, and a pair of annular stator cups each having a plurality of poles surrounding a central opening and a peripheral side wall. The stator cups are arranged over opposite faces of the joined-together stator plates with the poles of each stator cup interleaved with the poles of its respective stator plate. The peripheral edges of the stator plates are separated from each other to define a gap between them, and the free edges of the stator cup side walls are bent into the gap to mechanically join each stator cup to its respective stator plate. Each stator plate carries positioning means, such as a radially-projecting tab, and each stator cup carries cooperabte positioning means, such as a notch in its side wall for snugly accommodating a tab, for insuring accurate angular location of each stator cup with respect to the stator plates.

7 Claims, 8 Drawing Figures

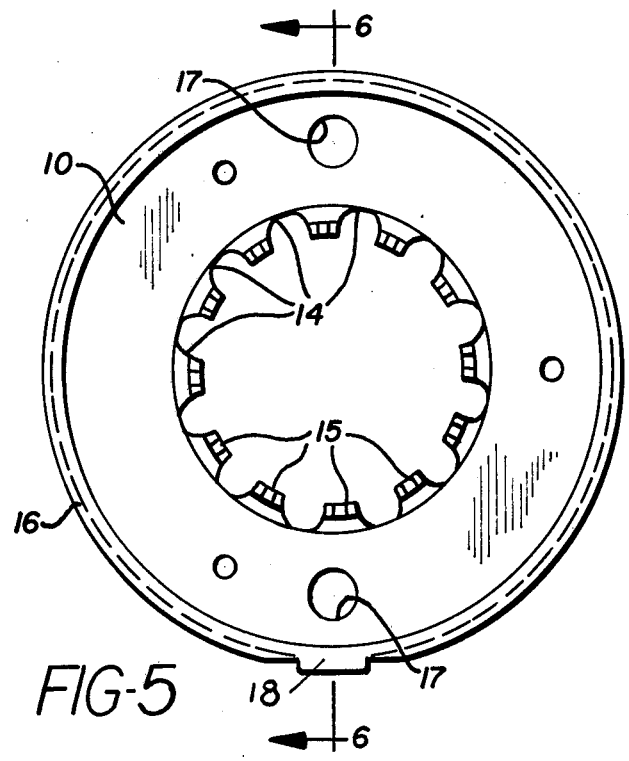
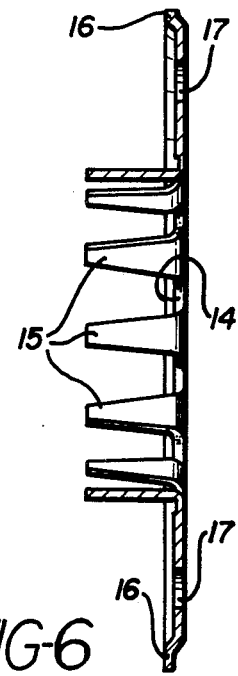
FIG-5  FIG-6
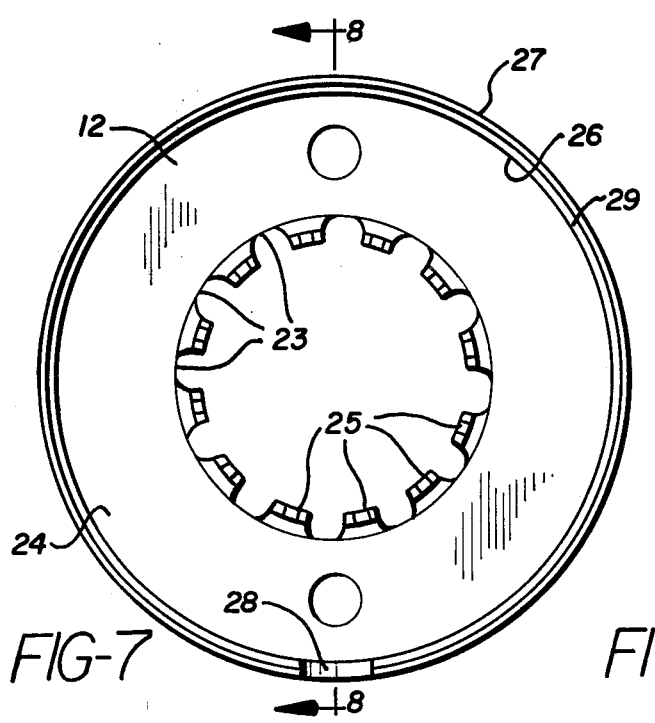
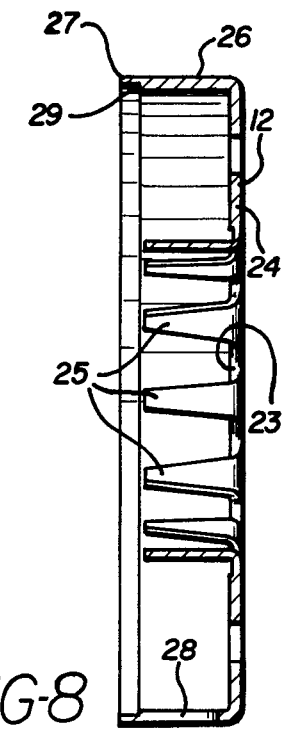
FIG-7  FIG-8

STEPPER MOTOR

This invention relates to stepper motors of the type illustrated and described in U.S. Pat. Nos. Re. 28,705 (particularly FIG. 6) and 3,633,055.

In these motors, an annular inner stator member is enclosed within two annular outer stator members. The inner stator member has a plurality of poles surrounding the central opening, the poles projecting in opposite directions. Each outer stator member has a plurality of poles surrounding the central opening, the outer members being arranged over opposite faces of the inner stator member with the poles of each outer member interleaved with those poles of the inner member which project toward that outer member. Two electrical coils, adjacent to the two sides of the inner stator member, surround the two sets of interleaved poles, and a single multipole permanent magnet rotor is located within both sets of interleaved poles. Each outer stator member has a peripheral side wall, the two side walls together defining a peripheral enclosure for the motor.

Stepper motors of this type are widely used in computer peripheral equipment, such as printers and floppy disk drives, and also in word processing typewriters. Such equipment is being required to operate at increasingly higher rates of speed, which calls for greater torque from the stepper motors. In addition, greater stepping accuracy of the motors is demanded, because of higher quality of work expected from this equipment. At the same time, there is pressure to reduce the cost of these motors.

Motor torque increases with a reduction in the size of the air gap between the rotor and the annular arrangement of poles within which it rotates. Stepping accuracy is dependent upon maintaining pole alignment, i.e., each pole should be equidistantly spaced from the two poles between which it is interleaved. Maintaining the accuracy of a small rotor/poles air gap and maintaining pole alignment requires a rigid connection between the inner and outer stator members.

It is an object of the present invention to provide a stepper motor wherein the inner and outer stator members are rigidly interconnected in a simple, inexpensive, and thoroughly reliable manner.

In some prior art stepper motors, such as the one shown in U.S. Pat. No. 3,633,055, the inner stator member comprises two cup-shaped elements arranged back-to-back, and the outer stator members are also cup-shaped. The peripheral wall of each outer member fits telescopically over the peripheral wall of its respective inner member peripheral wall. Because it is difficult to manufacture the cups, which are metal elements produced by a drawing operation, so that they are perfectly circular, when the cups are telescoped together, there is often misalignment between the cups. Consequently, the air gap between the rotor and the poles is adversely affected, and it is difficult to obtain good stator teeth alignment.

It is an object of the invention to overcome this problem by making the inner stator member of two plates arranged back-to-back, the plates having no peripheral walls which need to be telescoped with the peripheral walls of the outer stator cups. Another advantage of eliminating the inner member peripheral walls is that more room is created between the stator teeth and the outer stator member wall so that more turns of wire in the coils can be accommodated. The more turns of wire which are used, the greater the motor torque.

In the prior art motors referred to above, the two outer cup-shaped stator members are joined at their free edges by epoxy. This is a time-consuming procedure, and use of epoxy adds to the cost of the motor. In addition, the bond is not entirely reliable, as a result of which the cups sometimes separate or become skewed in shipment, thereby causing reduction in torque and stepping accuracy.

It is an object of the present invention to provide a stepper motor wherein the inner stator plates and outer stator cups are rigidly joined together in a mechanical way but without the use of independent fasteners.

Additional objects of the invention will be apparent from the following description in which reference is made to the accompanying drawings.

In the drawings:

FIG. 5 is a face view of a stator plate;

FIG. 6 is a cross-sectional view of the stator plate taken along line 6—6 of FIG. 5;

FIG. 7 is a face view of a stator cup; and

FIG. 8 is a cross-sectional view of the stator cup, taken along line 8—8 of FIG. 7.

Figure 1:
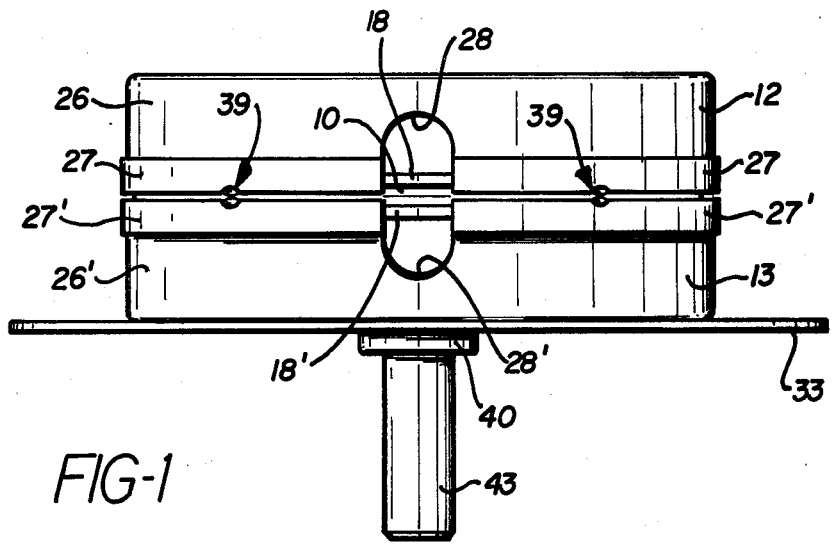
FIG. 1 is an elevational view of a stepper motor according to the present invention.
Figure 2:
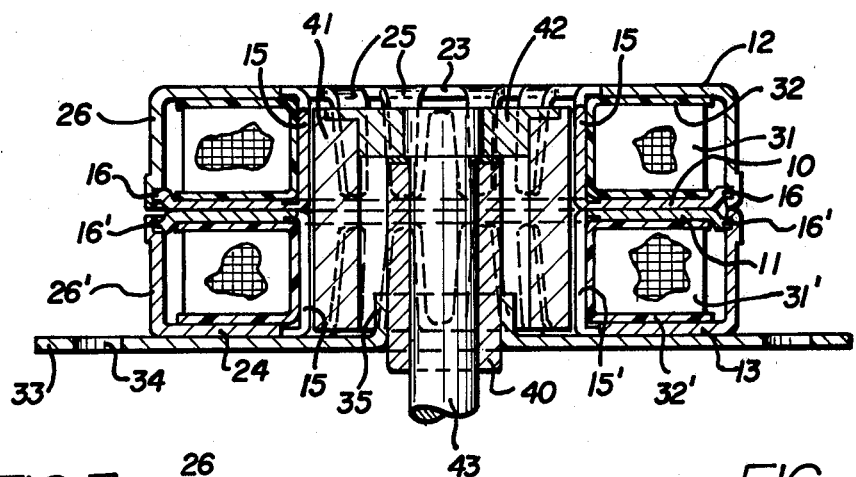
FIG. 2 is an axial cross-sectional view of the motor.

The stepper motor chosen to illustrate the present invention includes two stator plates 10 and 11 (FIG. 2) and two stator cups 12 and 13 (FIGS. 1 and 2). Stator plates 10 and 11 are substantially identical, and hence only one of the plates, 10, is illustrated in FIGS. 5 and 6. Similarly, stator cups 12 and 13 are substantially identical, and hence only one of the cups, 12, is illustrated in FIGS. 7 and 8.

Stator plate 10 (FIGS. 5 and 6) is of annular shape, having a central opening 14. A plurality of tapered poles 15 surround opening 14, the poles being circumferentially spaced apart. All the poles 15 project perpendicularly in the same direction from the plane of plate 10. The peripheral margin 16 of the plate is deformed out of the plane of the plate in the direction in which poles 15 project from the plate. A pair of positioning holes 17 are located in plate 10, and a positioning tab 18 projects radially from the edge of the plate.

With two exceptions, stator plate 11 is identical to plate 10, and the parts of plate 11 corresponding to those of plate 10 bear the same reference numerals, in FIGS. 1–4, employed above, followed by a prime. The two exceptions are that positioning holes 17 and positioning tab 18' of plate 11 are angularly offset by one-half a pole width with respect to holes 17 and tab 18 of plate 10.

Figure 3:
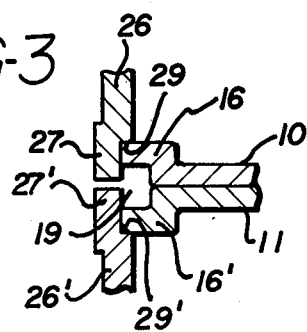
FIG. 3 is a fragmentary view, on an enlarged scale, of a portion of FIG. 2.
Figure 4:
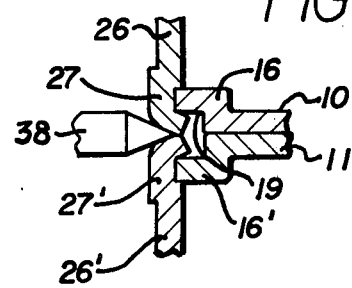
FIG. 4 is a view similar to FIG. 3 showing the step of joining the stator cups to the stator plates.

In order to form the inner stator member of the stepper motor, stator plates 10 and 11 are placed back-to-back with their respective positioning holes 17 and tabs 18 and 18' in axial alignment. The plates are permanently fixed together in this position, such as by welding or by a suitable adhesive. Due to the respective locations of positioning holes 17, the axis of each pole 15' of plate 11 will be angularly spaced a distance equal to one-half a pole width from the axis of a pole 15 of plate 10. Because of the offset margins 16 and 16' of the plates, a continuous annular gap or groove 19 (FIG. 3)

is present around the circumference of the fixed-together plates 10 and 11.

Stator cup 12 (FIGS. 7 and 8) is of annular shape, having a central opening 23 in its back wall 24. A plurality of tapered poles 25 surround opening 23, the poles being circumferentially spaced apart. The number, size, and spacing of poles 25 is identical to the number, size, and spacing of poles 15 of plate 10. All the poles 25 project perpendicularly in the same direction from the plane of back wall 24 of the cup. A peripheral side wall 26 projects from back wall 24 in the direction in which poles 25 project from the back wall. The free edge 27 of side wall 26 is enlarged in diameter so that the internal diameter of free edge 27 is about equal to the external diameter of stator plate 10, whereby the peripheral edge 16 of plate 10 fits snugly within edge 27 of cup 12 (see FIGS. 2 and 3). The enlarged edge 27 also defines an abutment in the form of an annular shoulder 29 within wall 26. A U-shaped positioning notch 28 (FIGS. 1, 7, and 8) is formed in side wall 27, the notch extending to the free edge of the side wall. The width of notch 28 is about equal to the width of positioning tab 18 of plate 10, so that the tab fits snugly within the notch.

With one exception, stator cup 13 is identical to cup 12, and the parts of cup 13 corresponding to those of cup 12 bear the same reference numerals, in FIGS. 1-4, employed above, followed by a prime. The exception is that positioning notch 28' of cup 13 is angularly offset by one-half a pole width with respect to the notch 28 of cup 12.

Prior to assembly of the stepper motor, a mounting plate 33 (FIGS. 1 and 2) is fixed, such as by welding or by a suitable adhesive, to the outer face of back wall 24 of stator cup 13, plate 33 having mounting holes 34. Mounting plate 33 has a central hole surrounded by a perpendicularly projecting annular flange 35.

Assembly of the stepper motor begins with the fixed-together stator plates 10 and 11. A coil of electrical wire 31 (FIG. 2), wound on a spool 32, is placed around poles 15 of plate 10, and a similar coil 31' is placed around poles 15' of plate 11. Stator cup 12 is placed over stator plate 10 with the peripheral edge 16 of the plate snugly fitted within the free edge 27 of the cup side wall, and positioning tab 18 snugly fitted within positioning notch 28 (FIG. 1). Similarly, stator cup 13 is placed over stator plate 11 with the peripheral edge 16' of the plate snugly fitted within the free edge 27' of the cup side wall, and positioning tab 18' snugly fitted within positioning notch 28'. Cooperation of tabs 18, 18' with notches 28, 28' insures accurate angular positioning of the stator cups with respect to the stator plates. Engagement of peripheral edges 16, 16' of the plates with shoulders 29, 29' of the cups insures accurate axial alignment of the stator cups with respect to the stator plates. In addition, notches 28 and 28' provide openings through which lead wires (not shown) can pass to supply electric current to the coils 31 and 31', respectively.

A tool 38 (FIG. 4), having a tapered end, is used to bend the free edges 27 and 27' into the gap 19 between the peripheral edges 16 and 16' of stator plates 10 and 11. This is done at a number of circumferentially spaced-apart locations 39 (FIG. 1) along the edges 27, 27' to stake these edges into the gap 19 and thereby permanently mechanically join each stator cup 12 and 13 to its respective stator plate 10 and 11. Alternatively, the entire lengths of edges 27 and 27' could be rolled into groove 19.

A sleeve bearing 40 (FIG. 2) is fixed within flange 35. A rotor assembly is furnished comprising a tubular permanent magnet rotor 41 having a disk 42 fixed to one of its ends, a shaft 43 extending from the center of the disk through rotor 41. The rotor assembly is inserted through openings 14 and 23 in the stator plates and stator cups while shaft 43 is inserted through bearing 40, the bearing being accommodated within a radial spacing between shaft 43 and rotor 41.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A stepper motor comprising:
   a pair of annular stator plates each having a central opening and a plurality of poles surrounding the opening and projecting from one face of the plate, the stator plates being fixed to each other in back-to-back relation with their poles projecting in opposite directions,
   a pair of annular stator cups each comprising a back wall having a central opening, a peripheral side wall projecting from one face of the back wall, and a plurality of poles surrounding the opening and projecting from the same face of the back wall as the side wall,
   the stator cups being arranged over opposite faces of the joined-together stator plates with the poles of each stator cup interleaved with the poles of its respective stator plate and the free edges of the stator cup side walls fitted over the peripheral edges of the stator plates,
   the peripheral edges of the stator plates being separated from each other to define a gap between them, and
   the free edges of the stator cup side walls being bent into the gap between the stator plate edges to mechanically join each stator cup to its respective stator plate.

2. A stepper motor as defined in claim 1 wherein the peripheral edges the stator plates are separated along substantially their entire length, so that the gap between the peripheral edges is a substantially continuous annular groove, and the free edges of the stator cup side walls are bent into the groove at a plurality of locations around the circumference of the side walls.

3. A stepper motor as defined in claim 1 wherein the peripheral edge of each stator plate is deformed out of the plane of the remainder of the plate, in the direction away from the other stator plate, so as to provide the separation between the plates.

4. A stepper motor as defined in claim 1 including positioning means carried by each of the stator plates, and positioning means carried by each stator cup and cooperable with the positioning means of its respective stator plate for insuring accurate angular location of each stator cup with respect to the stator plates.

5. A stepper motor as defined in claim 4 wherein the positioning means of each stator plate is a tab projecting radially from that plate, and the positioning means of each stator cup is a notch in the side wall of the cup which snugly accommodates the tab of its respective stator plate.

6. A stepper motor as defined in claim 1 including abutment means carried by each stator cup cooperating with its respective stator plate for insuring accurate axial alignment of the plate and cup poles.

7. A stepper motor as defined in claim 6 wherein the abutment means is an internal annular shoulder within the free edge of each cup against which the entire peripheral edge of its respective stator plate is seated.

* * * * *